United States Patent [19]

Oshizawa

[11] 4,378,695

[45] Apr. 5, 1983

[54] APPARATUS FOR MEASURING FUEL INJECTION TIMING

[75] Inventor: Hidekazu Oshizawa, Kumagaya, Japan

[73] Assignee: Diesel Kiki Co., Ltd., Tokyo, Japan

[21] Appl. No.: 217,554

[22] Filed: Dec. 17, 1980

[30] Foreign Application Priority Data

Dec. 25, 1979 [JP] Japan .............................. 54-168977

[51] Int. Cl.³ .......................................... G01M 15/00
[52] U.S. Cl. .................................. 73/119 A; 73/117.3
[58] Field of Search ........................... 73/119 A, 117.3

[56] References Cited

U.S. PATENT DOCUMENTS 4,158,305  6/1979  Shipley .............................. 73/119 A

FOREIGN PATENT DOCUMENTS 2302340  8/1973  Fed. Rep. of Germany ... 73/119 A
249849  12/1969  U.S.S.R. ........................... 73/119 A Primary Examiner—Jerry W. Myracle
Attorney, Agent, or Firm—Guy W. Shoup; Gerard F. Dunne

[57] ABSTRACT

An apparatus for measuring fuel injection timing has a pulse generator for generating a pulse train composed of pulses one of which is produced each time the engine rotates by a predetermined angle and a counter to which the pulses are applied as count pulses. The counter is controlled so as to be operative only for the period from the time of fuel injection to the time that the associated crank reaches top dead center. As a result, data indicative of the fuel injection advance can be obtained from the counter.

8 Claims, 7 Drawing Figures

APPARATUS FOR MEASURING FUEL INJECTION TIMING

The present invention relates to an apparatus for measuring the timing for fuel injection, and, more particularly, to an apparatus which measures the advance for the injection of fuel into an internal combustion engine from a fuel injection apparatus.

In a fuel injection type internal combustion engine system, it is necessary to adjust the injection timing of the apparatus which injects fuel into the internal combustion engine, e.g. a diesel engine, for obtaining the desired operating characteristics of the engine, and this injection timing for any given cylinder of the engine is generally expressed in terms of the difference in the angle of the crank for that cylinder between the time when the crank is at its top dead center and its position at the time of actual fuel injection. For this reason, the conventional fuel injection apparatus has a timer for adjusting the fuel injection timing and the timer is usually arranged so as to be directly driven by a mechanical device for adjusting the injection advance in accordance with the engine speed. Since it has recently become necessary to more precisely control the injection advance in accordance with the operating condition of the engine, higher accuracy measurement of the fuel injection timing of fuel injection apparatus is now required. However, with the prior art, it is impossible to easily measure the injection timing, that is, the injection advance, with better precision, and there has up to now not been realized an apparatus for accurately measuring the injection advance which can be easily incorporated into the control system for controlling fuel injection timing in internal combustion engine systems.

One object of the present invention is, therefore, to provide an apparatus which is capable of precisely measuring the fuel injection advance of a fuel injection system for an internal combustion engine.

Another object of the present invention is to provide an apparatus which is capable of electronically, easily, and precisely measuring the fuel injection advance without employing a complex and expensive mechanism.

In the present invention, the engine system is provided with a pulse generator which generates a pulse train composed of pulses each produced as the engine rotates through a predetermined angle and a counter to which the pulses are applied as count pulses. The apparatus according to this invention also has means for generating a first detection pulse for one cylinder indicative of the fuel injection timing and means for generating a second detection pulse indicative of the time when the associated crank reaches its top dead center. The counting operation of the counter is controlled by the first and the second detection pulses in such a way that the counter is operative only during the period between the occurrence of the first detection pulse and the occurence of the second detection pulse. As a result, data indicative of the fuel injection advance can be obtained from the counter. In a preferred embodiment, to increase the measurement accuracy, a frequency multiplier is employed in the pulse generator to shorten the time interval between adjacent pulses in the pulse train from the pulse generator, and a phase locked loop circuit is employed as a frequency multiplying circuit so as to greatly facilitate changing of the multiplication rate.

Other objects and advantages will become apparent upon reading the following detailed description, with reference to the attached drawing, in which:

FIG. 3A through FIG. 3E are timing charts for the signals in FIG. 2.

Figure 1:
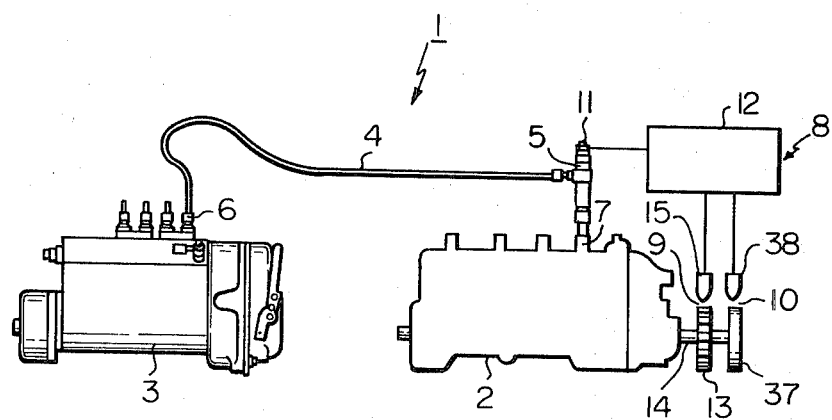
FIG. 1 is a diagramatic illustration of one embodiment of the present invention applied to the measurement of fuel injection timing in a diesel engine system.
Figure 1:
Figure 1:
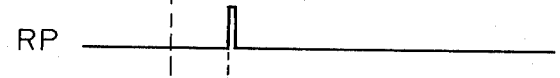
Figure 1:
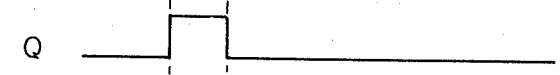
Figure 1:
Figure 1:
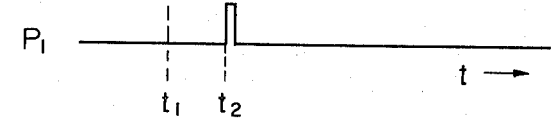

FIG. 1 illustrates a diesel engine system 1 comprising a diesel engine 2 and a fuel injection apparatus 3 for injecting the fuel from a fuel tank (not shown) into the cylinders of the diesel engine through injection pipes and injection nozzles. In FIG. 1, although only one injection pipe 4 and associated injection nozzle 5 are illustrated between one delivery valve 6 of the apparatus 3 and one cylinder 7 of the engine 2, the fuel is also injected into the other cylinders of the engine 2 from associated delivery valves of the injection apparatus 3 in a similar manner. The system is provided with a fuel injection timing measuring device 8 according to the present invention. The function of this measuring device 8 is to measure timing as an angle representing the injection advance. The measuring device 8 includes a sensor 9 for generating a signal which changes in frequency in accordance with the engine speed, a reference timing sensor 10 for generating a reference timing pulse at the time the crank of the engine 2 associated with the particular cylinder is at its top dead center, and a lift timing sensor 11 for generating a lift timing pulse in response to the lift operation of a needle valve (not shown) in the injection nozzle 5. The electrical signals from the sensors 9, 10 and 11 are applied to an electronic circuit unit 12 and are processed therein to compute the injection lead time on the basis of these signals.

Figure 2:
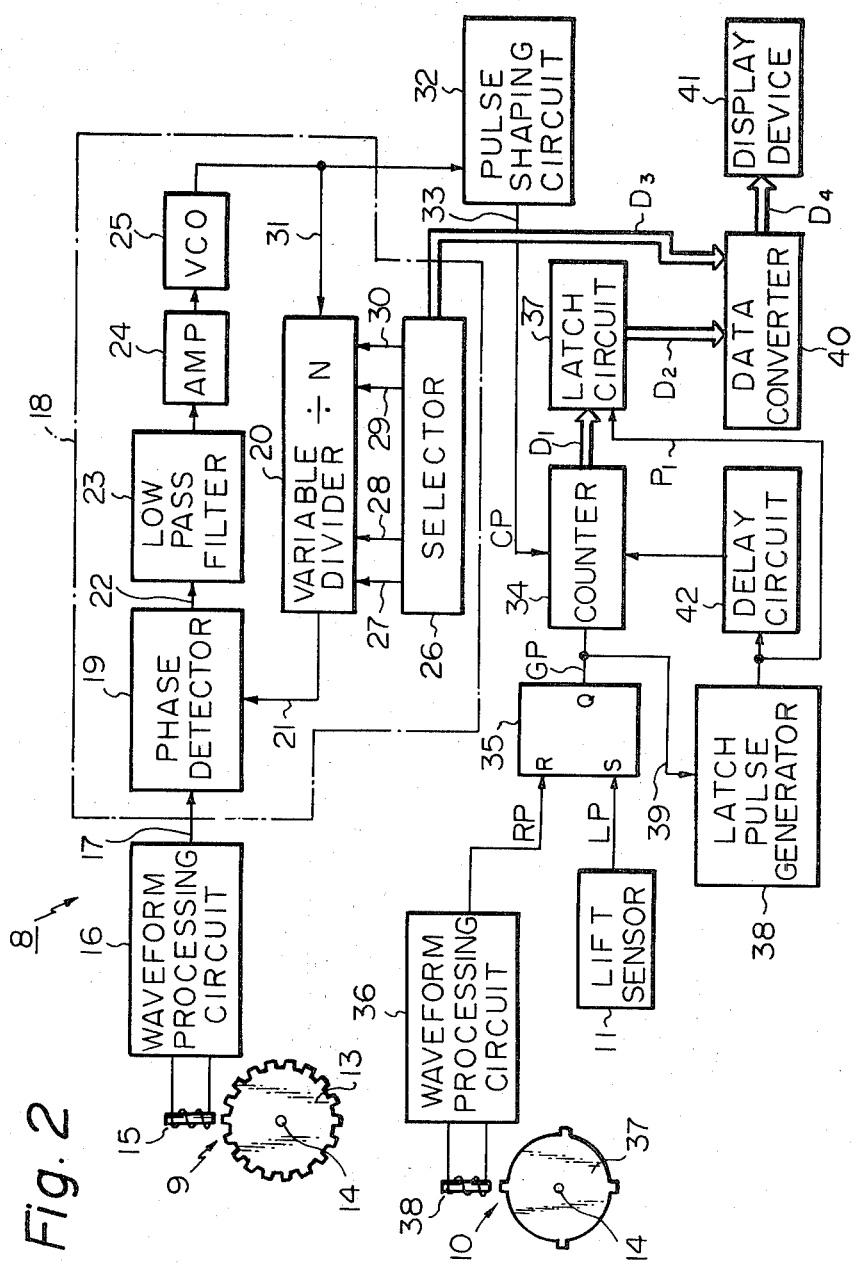
FIG. 2 is a block diagram of the measuring device shown in FIG. 1.

Referring to FIG. 2, there is shown a block diagram of the measuring device 8 illustrated in FIG. 1. The sensor 9 comprises a gear 13 secured to the crankshaft 14 of the engine 2 so as to rotate with the engine 2 and an electromagnetic pick-up coil 15 located close to the gear 13 (see FIG. 1.). A large number of cogs are formed on the periphery of the gear 13 and a variable a.c. output signal is produced from the electromagnetic pick-up coil 15 as these cogs approach the coil 15 and then go away from the coil 15 in sequence with the rotation of the engine 2. The output signal from the coil 15 of the sensor 9 is put into a waveform processing circuit 16 to generate a square wave signal having the same frequency as that of the output signal from the sensor 9. Since the cogs of gear 13 are formed at equal intervals on the periphery of the gear 13, the pulse train signal derived from the waveform processing circuit 16 is composed of pulses each produced as the crankshaft 14 rotates by a predetermined angle. In this embodiment, since the gear 13 has eighteen cogs, one pulse is produced by the circuit 16 for every 20 degrees of rotation of the gear 13. The above-mentioned pulse train from the waveform processing circuit 16 is sent through an output line 17 to a frequency multiplier 18.

The frequency multiplier 18 is arranged as a phase locked loop (PLL) circuit and the pulse train signal appearing on the line 17 is applied to a phase detector 19 of the PLL circuit. The phase detector 19 also receives a divided signal from a variable divider 20 through a line 21 so that the resulting phase difference signal which changes in magnitude in proportion to the difference in phase between these two input signals appears on an output line 22. The resulting phase difference signal is then passed through a low pass filter 23 to eliminate the high frequency components from the phase difference signal and the signal derived from the low pass filter 23 is sent through an amplifier 24 to a voltage controlled oscillator (VCO) 25 as its frequency control signal. The output signal from the voltage controlled oscillator 25, which changes in frequency in accordance with the magnitude of the signal derived from the amplifier 24, is applied to the variable divider 20 through a line 31.

The variable divider 20 is a circuit for dividing the frequency of the output signal from the voltage controlled oscillator 25 in accordance with the dividing ratio determined by a selector 26. A four-bit digital data signal from the selector 26, indicative of a selected dividing ratio N, is applied to the variable divider 20 through lines 27, 28, 29 and 30 and the signal applied through the line 31 to the variable divider 20 is divided by the ratio N determined by the four-bit digital data signal from the selector 26. The divided signal from the variable divider 20 is applied to the phase detector 19, and then, the frequency of the output signal from the voltage controlled oscillator 15 is controlled in such a way that the phase of the signal from the variable divider 20 is coincident with that of the signal from the waveform processing circuit 16. As a result, if the dividing ratio set in the variable divider 20 is represented by N, the frequency of the signal derived from the voltage controlled oscillator 25 becomes exactly N times as great as that of the signal from the waveform processing circuit. That is, the frequency of signal output from the waveform processing circuit 16 is multiplied in accordance with the data selected by the selector 26, and the resulting multiplied signal can be derived from the voltage controlled oscillator 25 as the output signal of the frequency multiplier 18.

The signal output from the voltage controlled oscillator 25 is also applied to a pulse shaping circuit 32 to shape the waveform thereof and the resulting pulse signal CP from the pulse shaping circuit 32 is applied through a line 33 to a counter 34 as count pulses.

In order to count the number of count pulses produced during the period from the time the needle valve is lifted to the time the associated crank reaches top dead center, there is provided an R-S flip-flop 35 which produces count gate pulses for controlling the counting operation of the counter 34 on the basis of lift timing pulses LP from the lift timing sensor 11 and reference timing pulses RP produced by the reference timing sensor 10 and a waveform processing circuit 36. The sensor 10 is composed of a gear 37 secured to the crankshaft 14 and an electromagnetic pick-up coil 38. The sensor 10 is different from the sensor 9 only in that the cogs of the gear 37 are formed at intervals of 90 degrees for a four cylinder engine. Since the relative positional relationship between the gear 37 and the coil 38 is such that one of the cogs of the gear 37 is opposite the coil 38 each time the associated crank is at top dead center, the coil 38 produces a signal indicative of the time the crank is at top dead center and this signal is applied to the waveform processing circuit 36 to produce the reference timing pulses indicative of top dead center timing. As the lift timing pulses LP from the lift sensor 11 are applied to the SET terminal of the R-S flip-flop and the reference timing pulses from the waveform processing circuit 36 are applied to a RESET terminal of the R-S flip-flop 35, as illustrated in FIGS. 3A to 3C, the Q output of the R-S flip-flop 35 which is used as a count gate pulse assume a high level for the period from the time when the lift timing pulse is produced at the time of $t_1$ to the time when the reference timing pulse RP is produced at the time of $t_2$. The counter 34 is arranged so as to be operative only during the high level state of the count gate pulse so that the number of pulses applied to the counter for the duration from $t_1$ to $t_2$ can be counted.

The count registered by the counter 34 is output as count data $D_1$ and the count data $D_1$ are applied to a latch circuit 37 also receiving latch pulses $P_1$, which are generated in a latch pulse generator 38 on the basis of the count gate pulses derived from the R-S flip-flop 35 through a line 39 (shown in FIG. 3E). Since the time when the latch pulse $P_1$ is generated is determined just after the counting operation of the counter 34 is inhibited by a low count gate pulse GP, the resulting count data $D_1$, which are obtained by counting the pulses produced over a time determined by each count gate pulse, is stored in the latch circuit 37 by the application of the latch pulse, and then the latched data $D_2$ is applied to a data converter 30 while the next data from the counter 26 is being latched in the latch circuit 37. The data converter 40 also receives data $D_3$ indicative of the dividing ratio from the selector 26 and the latched data $D_2$ is converted into the angle indicative of injection advance at that instant on the basis of these two input data. The resulting data $D_4$ indicative of the injection advance in an angle is displayed by display device 41.

The latch pulses from the latch pulse generator 38 are also applied through a delay circuit 42 to the counter 34 as reset pulses. Therefore, the counter 34 is reset by the reset pulses after every latching of the data $D_1$ in the latch circuit 37 so that the counter 34 can be ready to carry out the next counting operation.

As understood from the foregoing description, the accuracy of measurement of the device 8 depends upon the number of cogs of the gear 13. However, since the frequency of the pulse train signal from the waveform processing circuit 16 is multiplied by the frequency multiplier 18, higher accuracy measurement can, at any rate, be easily attained without employing an expensive gear having a large number of cogs only by increasing the dividing rate N set in the variable divider 20.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. An apparatus for measuring the fuel injection timing of a fuel injection apparatus which injects fuel into an engine, comprising:
   a pulse generator for generating a pulse train signal which changes in frequency in relation to the speed of the engine;
   a first timing detecting means for generating a first timing pulse in response to fuel injection;
   a second timing detecting means for generating a second timing pulse at the time when the associated crank of the engine is at top dead center;
   a gate signal generator for generating a gate signal having a pulse width corresponding to the period from the time of occurrence of said first timing pulse to the time of occurrence of said second timing pulse, and;

a counter for counting the pulses of said pulse train signal from said pulse generator for the period of the pulse width of the gate signal, wherein said pulse generator has a sensor for generating a signal changing in frequency in response to the speed of the engine and a frequency multiplying circuit for multiplying the frequency of said signal from said sensor.

2. An apparatus for measuring the fuel injection timing of a fuel injection apparatus as claimed in claim 1 wherein said pulse generator is a device for generating a 3. An apparatus for measuring the fuel injection timing of a fuel injection apparatus as claimed in claim 1 wherein said frequency multiplying circuit is a phase locked loop circuit having a voltage controlled oscillator, a frequency divider for dividing an output signal from said voltage controlled oscillator by N, and a phase detector for producing a phase signal indicative of the difference in phase between the signal from said pulse generator and the signal from said frequency divider and said the phase signal is applied to said voltage controlled oscillator as a frequency control signal.

4. An apparatus for measuring the fuel injection timing of a fuel injection apparatus as claimed in claim 1 wherein said frequency multiplying circuit is a phase locked loop circuit having a voltage controlled oscillator, a frequency divider for dividing an output signal from said voltage controlled oscillator by N, and a phase detector for producing a phase signal indicative of the difference in phase between the signal from said pulse generator and the signal from said frequency divider and the phase signal is applied to said voltage controlled oscillator as a frequency control signal.

5. An apparatus for measuring the fuel injection timing of a fuel injection apparatus as claimed in claim 3 or 4 wherein said divider is a variable divider.

6. An apparatus for measuring the fuel injection timing of a fuel injection apparatus as claimed in claim 1, further comprising a data converter for converting the count registered by said counter into timing data indicative of the injection advance and means for displaying the timing data.

7. An apparatus for measuring the fuel injection timing of a fuel injection apparatus which injects fuel into an engine, comprising;
 a pulse generator for generating a pulse train signal which changes in frequency in relation to the speed of the engine;
 a first timing detecting means for generating a first timing pulse in response to fuel injection;
 a second timing detecting means for generating a second timing pulse at the time when the associated crank of the engine is at top dead center;
 a gate signal generator for generating a gate signal having a pulse width corresponding to the period from the time of occurrence of said first timing pulse to the time of occurrence of said second timing pulse, and;
 a counter for counting the pulses of said pulse train signal from said pulse generator for the period of the pulse width of the gate signal,
 wherein said pulse generator includes a sensor for generating a pulse train signal composed of pulses produced each time said crankshaft rotates by a predetermined angle and a frequency multiplying circuit for multiplying the frequency of the pulse train signal, and the resulting signal multiplied by said frequency multiplying circuit is applied to said counter.

8. An apparatus for measuring the fuel injection timing of a fuel injection apparatus as claimed in claim 7 wherein said sensor has a coil for detecting changes in the magnitude of a magnetic field and a rotating member which rotates at a speed proportional to the engine speed so as to provide changes in a magnetic field to be detected by said coil.

* * * * *